United States Patent [19]

Field et al.

[11] 3,985,965

[45] Oct. 12, 1976

[54] DIGITAL SIGNAL GENERATOR

[75] Inventors: Robert G. Field, Millis; Marvin S. Mason, Lexington, both of Mass.

[73] Assignee: GTE Sylvania Incorporated, Stamford, Conn.

[22] Filed: July 2, 1975

[21] Appl. No.: 592,650

[52] U.S. Cl. ........................ 179/15 BY; 179/84 VF

[51] Int. Cl.[2] ............................................ H04J 3/12

[58] Field of Search....... 179/15 BY, 15 AT, 84 UF, 179/18 H, 18 J, 99

[56] References Cited

UNITED STATES PATENTS

| | | | |
|---|---|---|---|
| 3,435,149 | 3/1969 | Inose | 179/18 J |
| 3,801,746 | 4/1974 | Buchner | 179/15 BY |
| 3,870,826 | 3/1975 | Carbrey | 179/15 AT |
| 3,899,642 | 8/1975 | Jones | 179/15 BY |
| 3,906,164 | 9/1975 | Philip | 179/15 AT |

*Primary Examiner*—David L. Stewart
*Attorney, Agent, or Firm*—David M. Keay; Elmer J. Nealon; Norman J. O'Malley

[57] ABSTRACT

Digital signal generator for producing digital signalling codes employed in a digital telephone communication system including several tone generators for providing presynthesized digital tone signals which are convertible to audible tones. Permutable digital codewords are produced by a codeword generator. Some of the tone signals and codewords are combined by FSK and switching circuitry. Tone signals, codeword signals, and combination signals are stored in storage registers and read out by a multiplexer to provide a continuous TDM bit stream of 60 channels of digital signalling codes.

5 Claims, 13 Drawing Figures

70

DIGITAL SIGNAL GENERATOR

BACKGROUND OF THE INVENTION

This invention relates to apparatus for generating digital signals. More particularly, it is concerned with apparatus for producing digital signalling codes for use in digital communication systems.

In telephone communication systems a variety of signalling codes are employed in the operation of the system. Certain of these signalling codes must be audible tones to the telephone subscriber. In digital communication systems the signalling codes as well as the communication data are transmitted in digital format. It has been customary to provide audible signalling tones by employing an analog signal generator, converting the analog signals to digital signals for transmission, and then re-converting the digital signals to audible signalling tones.

Apparatus for use in a pulse code modulation digital system to provide digital signalling codes which when converted to analog signals provide audible tones to the subscriber is described in an article entitled "Multifrequency (MF) Tone-Generating System for a Pulse-Code Modulation (PCM) Digital Exchange" by Satyan G. Pitroda published in the IEEE Transactions on Communication Technology, Vol. COM-19, No. 5, Oct. 1971, pages 588–596. This article describes a technique of presynthesizing tone signals as patterns of digital bits which are stored in read-only memories. These digital tone signals are transmitted as PCM digital signals and are converted to analog signals to provide audible tones to the subscriber.

In addition to audible tones many other signalling tones in the form of digital codewords are employed in the operation of digital telephone communication systems. Some of the signalling codes may be combinations of codewords which automatically cause operations to be performed in the system together with tone signals for the benefit of subscribers. The digital signalling codes must be generated and made available to the channels of the system. Presently, as described in the aforementioned article, the signalling codes are continuously generated, and the injection system for outpulsing the signals from the generators to the communication channels includes two sets of crosspoints. Appropriate address information is stored and is utilized to close appropriate crosspoints at the proper times to inject the selected signalling codes in the proper channel time slots.

SUMMARY OF THE INVENTION

Digital signalling code generating apparatus in accordance with the present invention employs all digital techniques to produce a variety of digital signalling codes, both audible tone signals and codeword signals, in a time division multiplexed bit stream which may be directly addressed by a digital switching network in the same manner as the communication channels to and from subscribers. The apparatus includes tone generating means for producing a plurality of recurring sequences of digital signals, each of which is capable of being converted to a continuous audible tone. The apparatus also includes codeword generating means for producing a plurality of recurring sequences of digital signals, each of which provides a continuously repeated codeword. Storage means are coupled to the generating means for storing digital signals from the generating means. A multiplexing means is coupled to the storage means and to an output line for time division multiplexing digital signals in the storage means onto the output line in a plurality of channels. A different predetermined digital signalling code pattern is thereby continuously available in each channel. The output line may be directly connected as one of the inputs to a digital switching network so that any available signalling code may be selected and directly injected into any channel by the switching network in the same manner that digital data from incoming channels is switched to outgoing channels.

BRIEF DESCRIPTION OF THE DRAWINGS

Additional objects, features, and advantages of digital signal generating apparatus in accordance with the present invention will be apparent from the following detailed discussion together with the accompanying drawings wherein.

Figure 1:
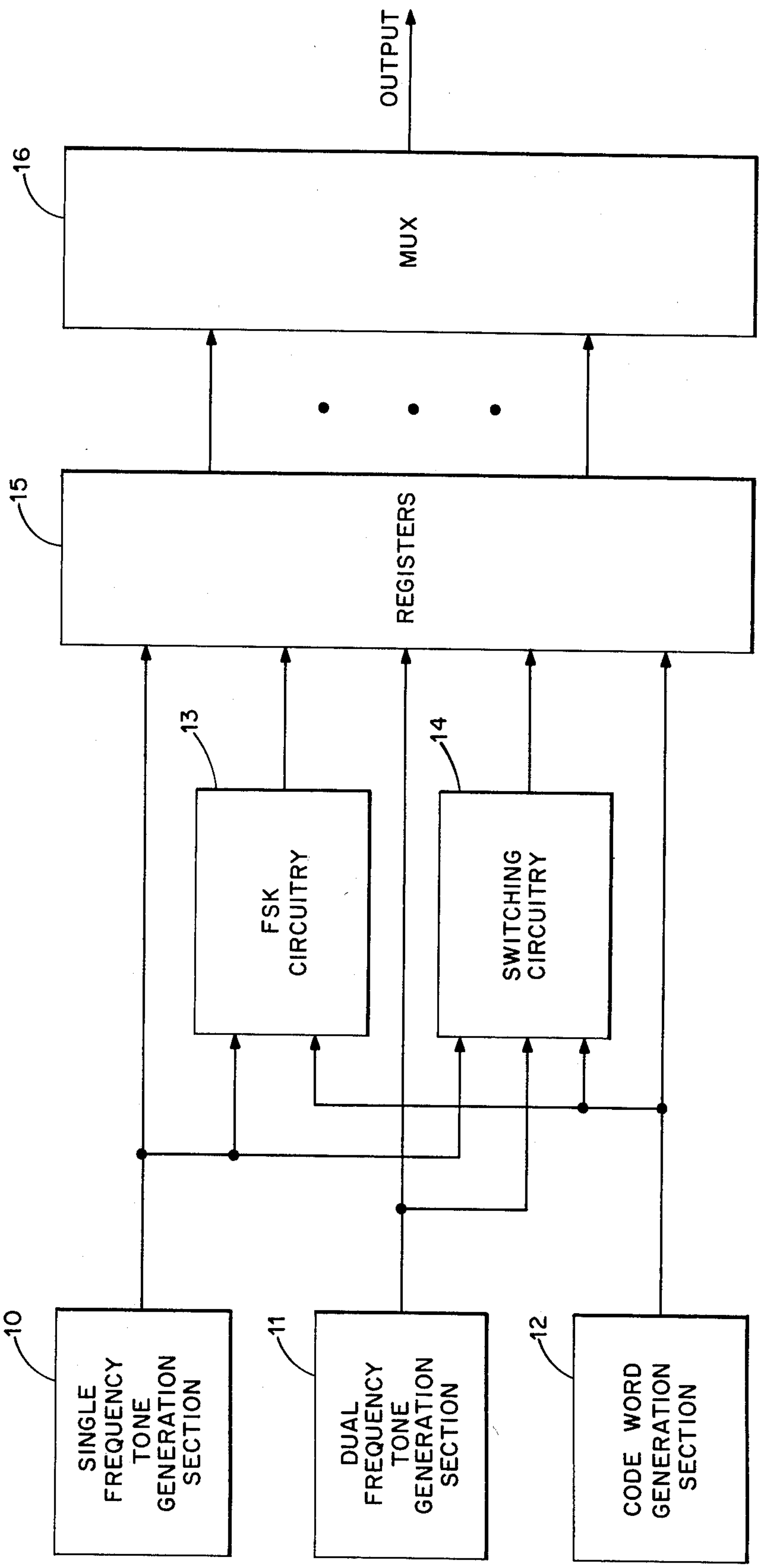
FIG. 1 is a block diagram of digital signal generating apparatus in accordance with the present invention.

Standard well-known symbols and notations are employed throughout the drawings to designate various logic components.

DETAILED DESCRIPTION OF THE INVENTION

The specific embodiment of the digital signal generating apparatus in accordance with the invention as illustrated in the drawing is employed in conjunction with a time division multiplexed (TDM) digital communication system in which the digital signals are in the continuously variable slope delta modulation (CVSD) format. In this format one bit is present during each time slot of each channel. In the specific embodiment under discussion the bit rate for each channel is 38.4 KHz and each line is capable of carrying 60 channels. The bit stream rate on each line is therefore at a 2.304 MHz rate.

The digital signal generator is illustrated in block diagram form in FIG. 1. The apparatus includes a single frequency tone generation section 10 in which are stored presynthesized digital tone signals which when properly converted to analog signals provide single frequency audible tones. A dual frequency tone generation section 11 includes generators for producing multiple frequency presynthesized digital tone signals which are convertible to dual frequency tones. A codeword generation section 12 produces code patterns in digital bit format for signalling purposes within the system. In the particular system under discussion an 8-bit permutable codeword format is employed.

Certain of the digital signals generated in the single frequency tone generation section 10 and codewords generated in the codeword generation section 12 are combined by FSK circuitry 13 to provide frequency-shift keyed combination signals. In addition, switching circuitry 14 also combines certain of the bit patterns from the generation sections into desired combinations of signal code patterns.

The tone signals, codeword signals, and combination signals which are to be made available to the system are stored in registers 15. The registers 15 are read out during each frame of 60 channels by a multiplexer 16. The OUTPUT of the multiplexer 16 is a 60 channel time division multiplexed bit stream at a 2.304 MHz rate. The apparatus provides up to 60 channels of continuously available digital signalling codes to a digital switching network.

Figure 2:
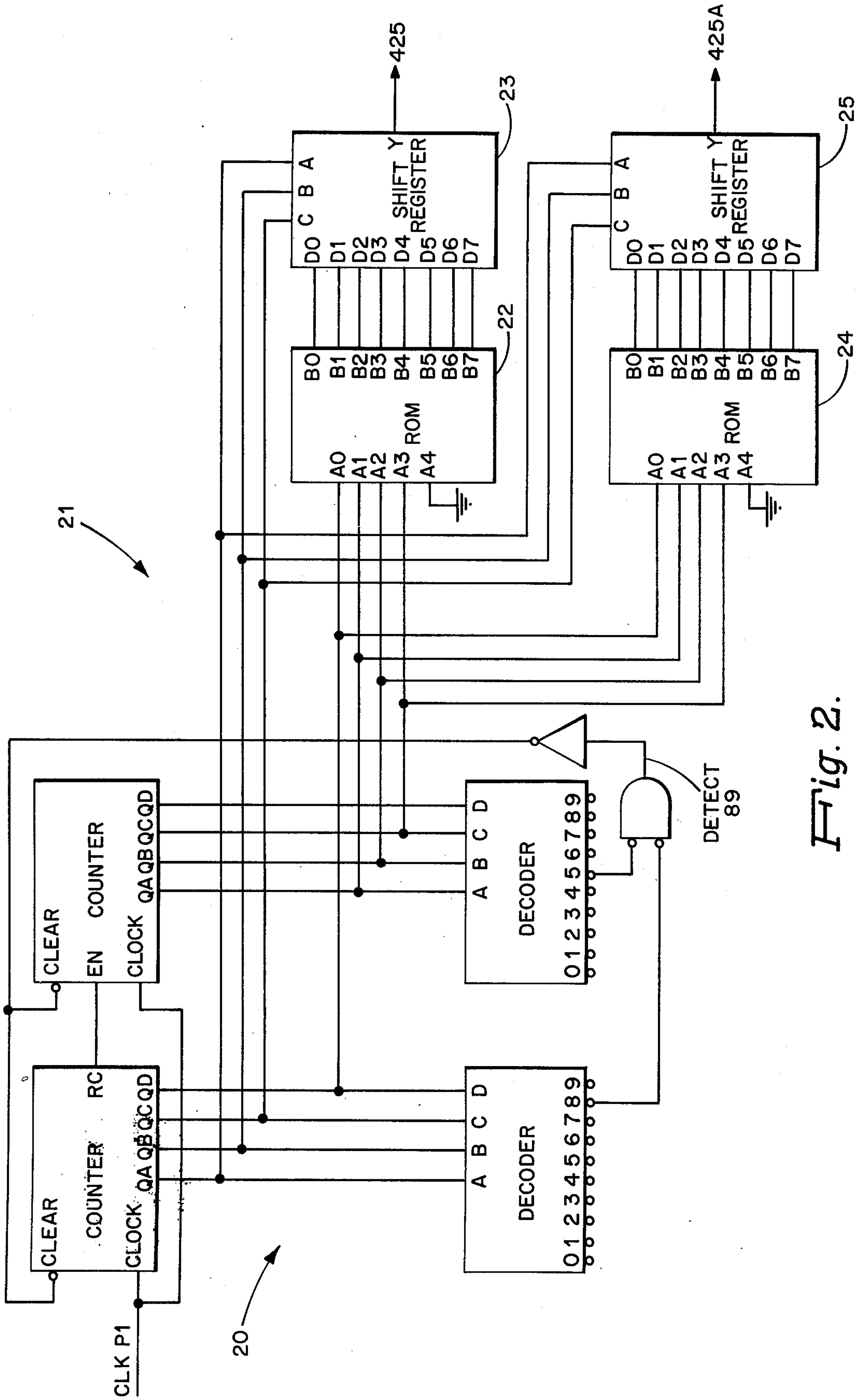
FIGS. 2, 3, 4, and 5 are detailed logic diagrams of single frequency tone generators for producing digital bit patterns of presynthesized single frequency tone signals.

The signle frequency tone generation section 10 includes several individual tone generators. A tone generator 20 for producing a presynthesized digital pattern which is convertible to an audible tone of 425 Hz is illustrated in FIG. 2. The tone generator 20 includes a counter 21 which is a straightforward arrangement of logic components including counters, decoders, and gates for repeatedly counting through a sequence of 89 clock pulses. The clock pulses CLKP1 are applied at a 38.4 KHz rate which is a bit rate for each channel of the system.

The count in the counter 21 is applied to the combination of a read-only memory 22 and a parallel-to-serial shift register 23. The contents of the read-only memory 22 is an appropriate arrangement of 89 stored bits for producing the desired presynthesized digital tone pattern for the 425 Hz tone. The read-only memory 22 is read out in groups of 8 bits in parallel. The parallel-to-serial shift register 23 provides a serial bit output at a 38.4 KHz rate at the output labeled 425. The bit pattern of 89 bits stored in the read-only memory 22 and repeatedly read out at the 38.4 KHz rate is capable of being converted to a 425 Hz audio signal when applied to a CVSD digital-to-analog converter.

The count in the counter 21 is also applied to the combination of a second read-only memory 24 and a second parallel-to-serial shift register 25. The contents of the read-only memory 24 read out through the shift register 25 provides a continuously repeated output pattern of 89 bits labeled 425A. This serial bit pattern is convertible to an audio signal of 425 Hz having a different amplitude from that produced by the 425 signal.

Figure 3:
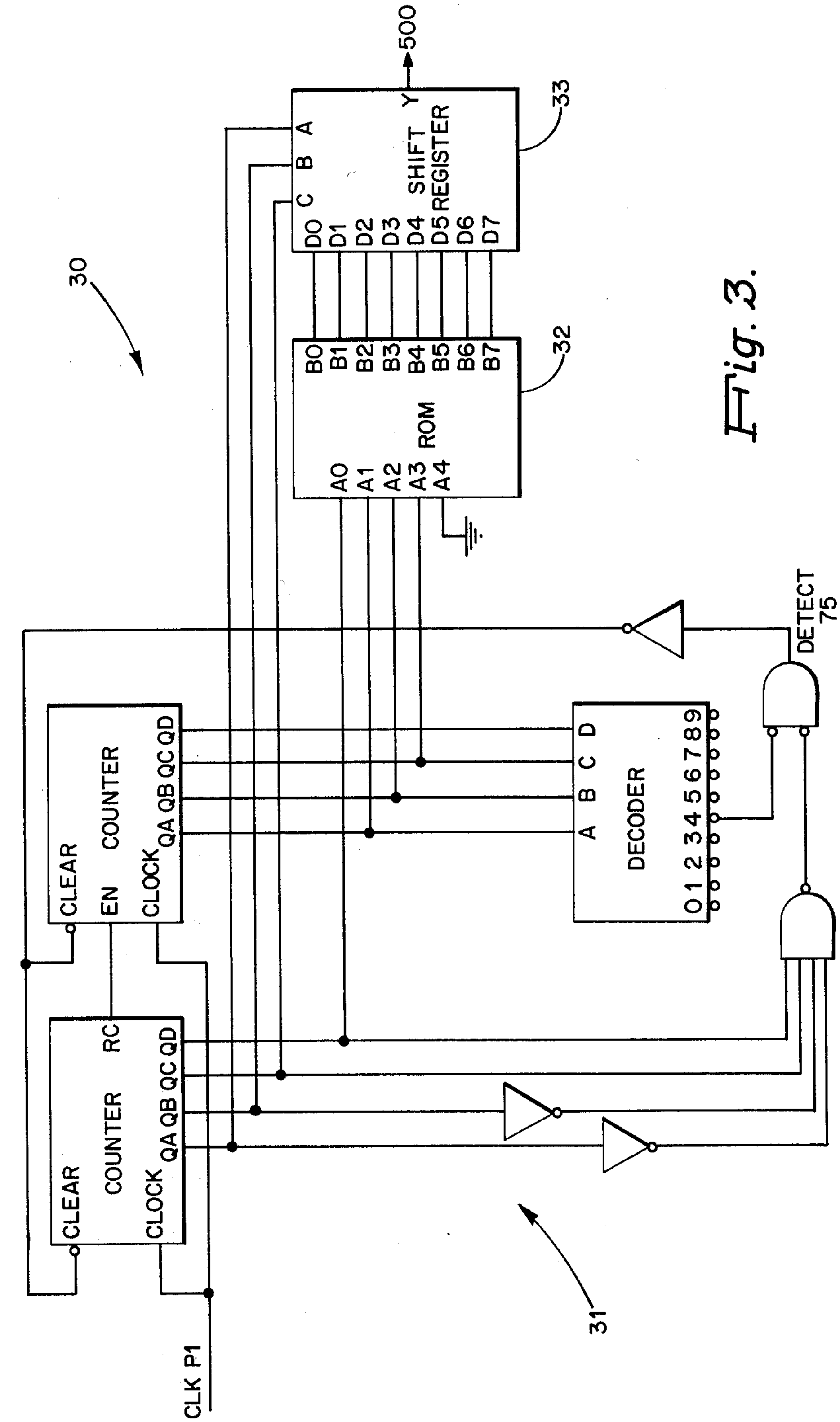

An individual tone generator 30 for producing a presynthesized digital tone pattern which is convertible to a 500 Hz audible tone is illustrated in FIG. 3. This generator includes a counter 31 which is a straightforward arrangement of counters, decoders, and gates for repeatedly counting through a sequence of 75 clock pulses CLKP1. The count in the counter 31 is applied to the combination of a read-only memory 32 and a parallel-to-serial shift register 33. The stored presynthesized pattern of 75 bits is produced repeatedly at the output labeled 500.

Figure 4:
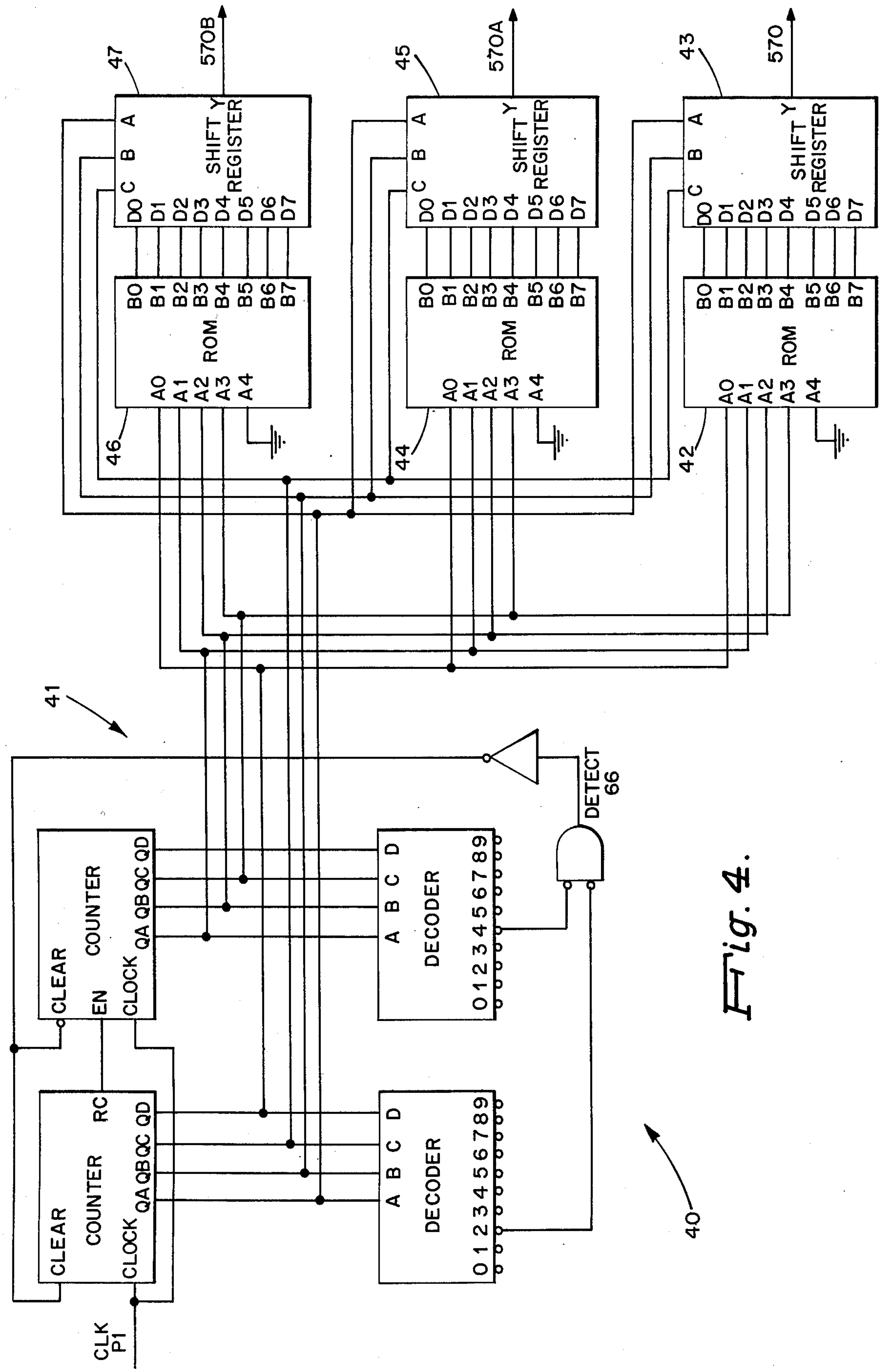

FIG. 4 illustrates an individual tone generator 40 including a counter 41 of counters, decoders, and gates which counts through a recurring count of 66 clock pulses CLKP1. The count in the counter 41 is applied to a read-only memory 42 and a parallel-to-serial shift register 43. The output labeled 570 is presynthesized digital bit pattern which is convertible to a 570 Hz tone.

The count in the counter 41 is also applied to a read-only memory 44 and a shift register 45. The output signal labeled 570A is a 570 Hz tone signal of different amplitude. A 570 Hz tone signal of a third amplitude labeled 570B is obtained from the bit pattern stored in a read-only memory 46 read out through a parallel-to-serial shift register 47 under control of the counter 41.

Figure 5:
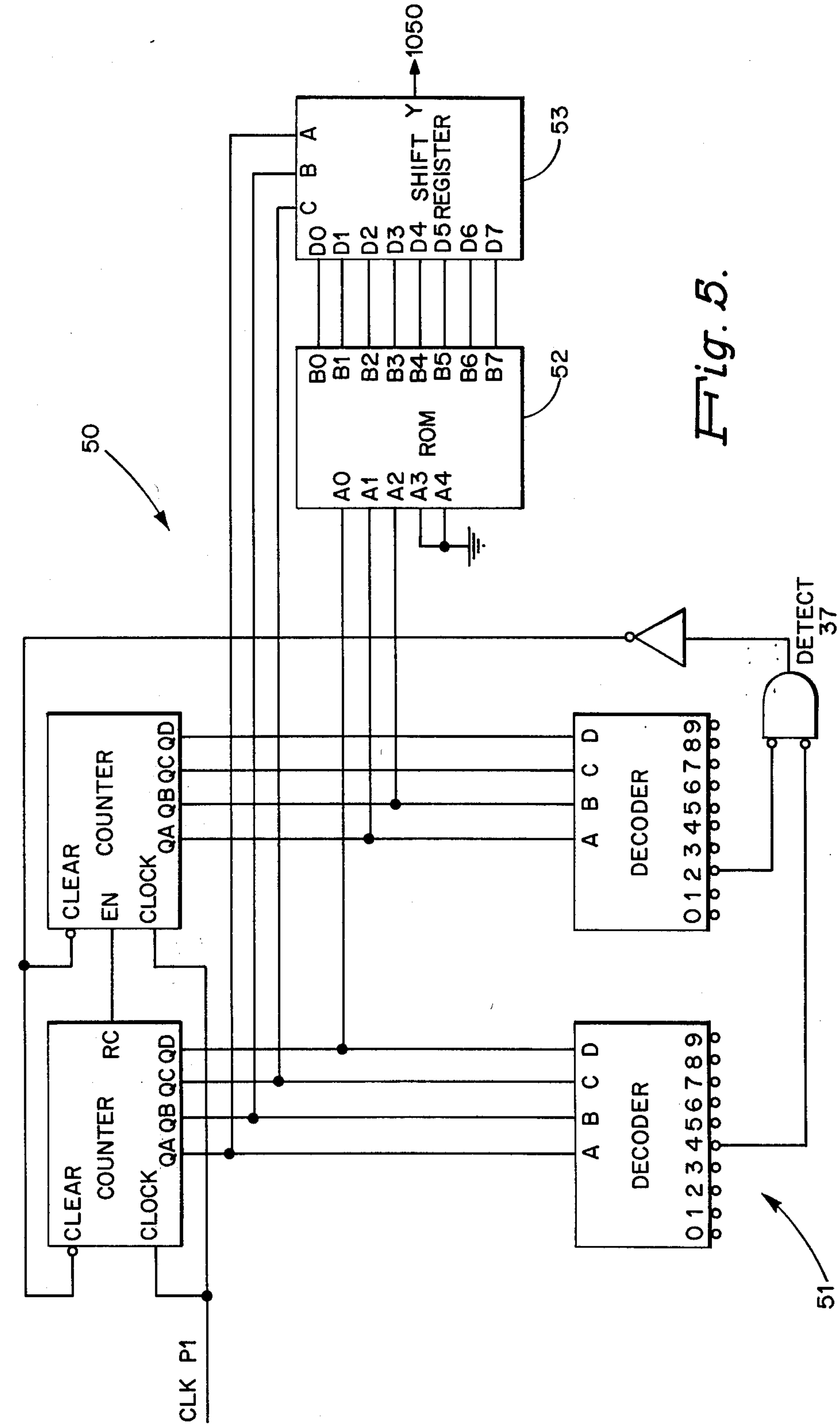
Figure 6:
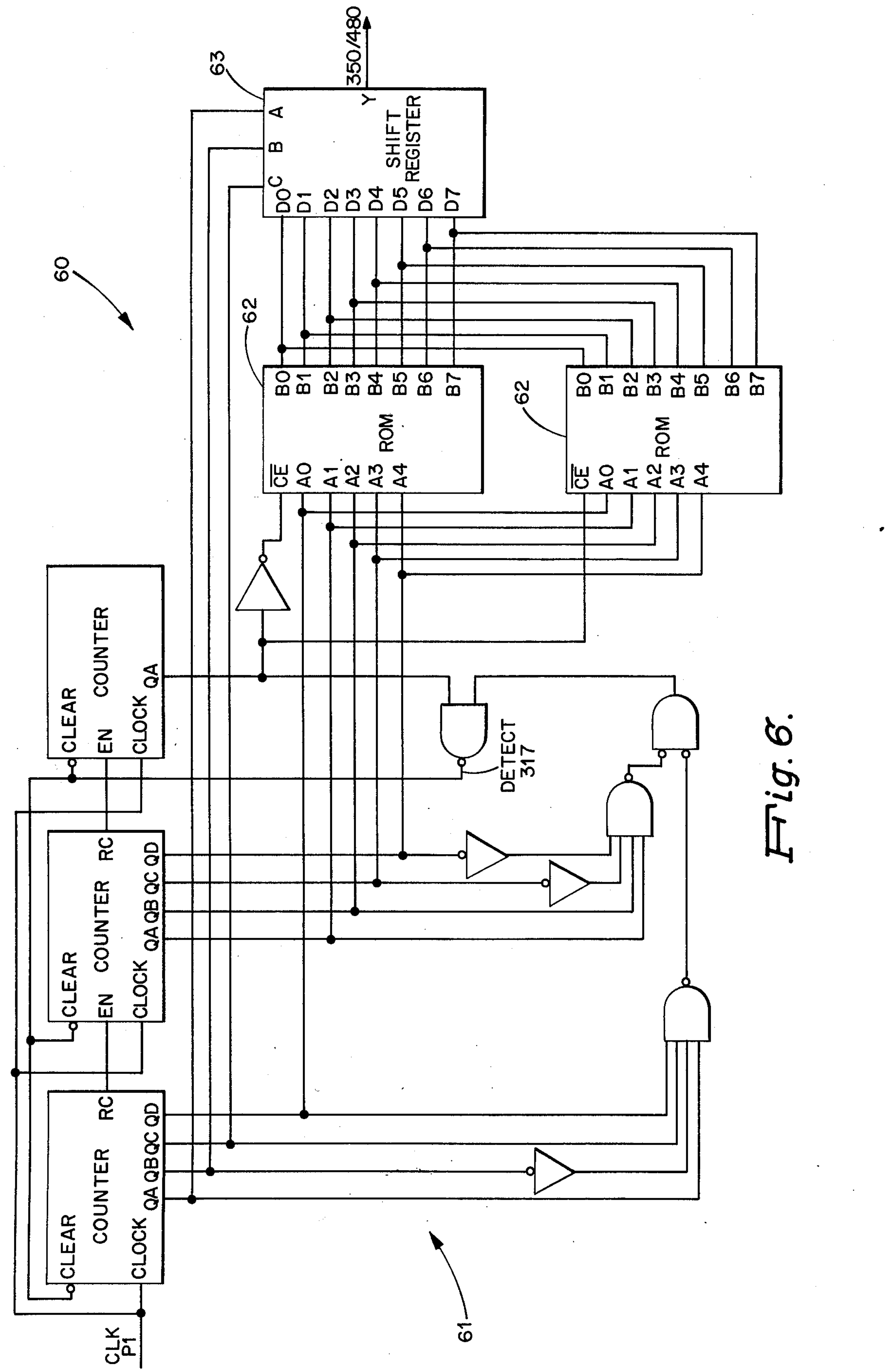
FIGS. 6, 7, and 8 are logic diagrams illustrating tone generators for producing digital bit patterns of presynthesized dual frequency tone signals.

Another single frequency tone generator 50 is illustrated in FIG. 5. This generator includes a counter 51 arranged to repeatedly count through a count of 37 clock pulses CLK1. The stored digital bits in a read-only memory 52 are read out through a parallel-to-serial shift register 53 to produce a 1050 Hz tone signal labeled 1050. A dual frequency tone generator 60 of the dual frequency tone generation section 11 is illustrated in FIG. 6. This generator alos includes a counter 61 which is a straightforward arrangement of counters, gates, and inverters and which repeatedly counts clock pulses CLKP1 through a count of 317. The count is the counter 61 is applied to a read-only memory 62 and a parallel-to-serial shift register 63. The read-only memory 62 contains 317 bits in a code pattern which is read out through the parallel-to-serial shift register 63 to produce an output bit pattern labeled 350/480. This signal is convertible to an audible dual frequency tone of 350 and 480 Hz.

Figure 7:
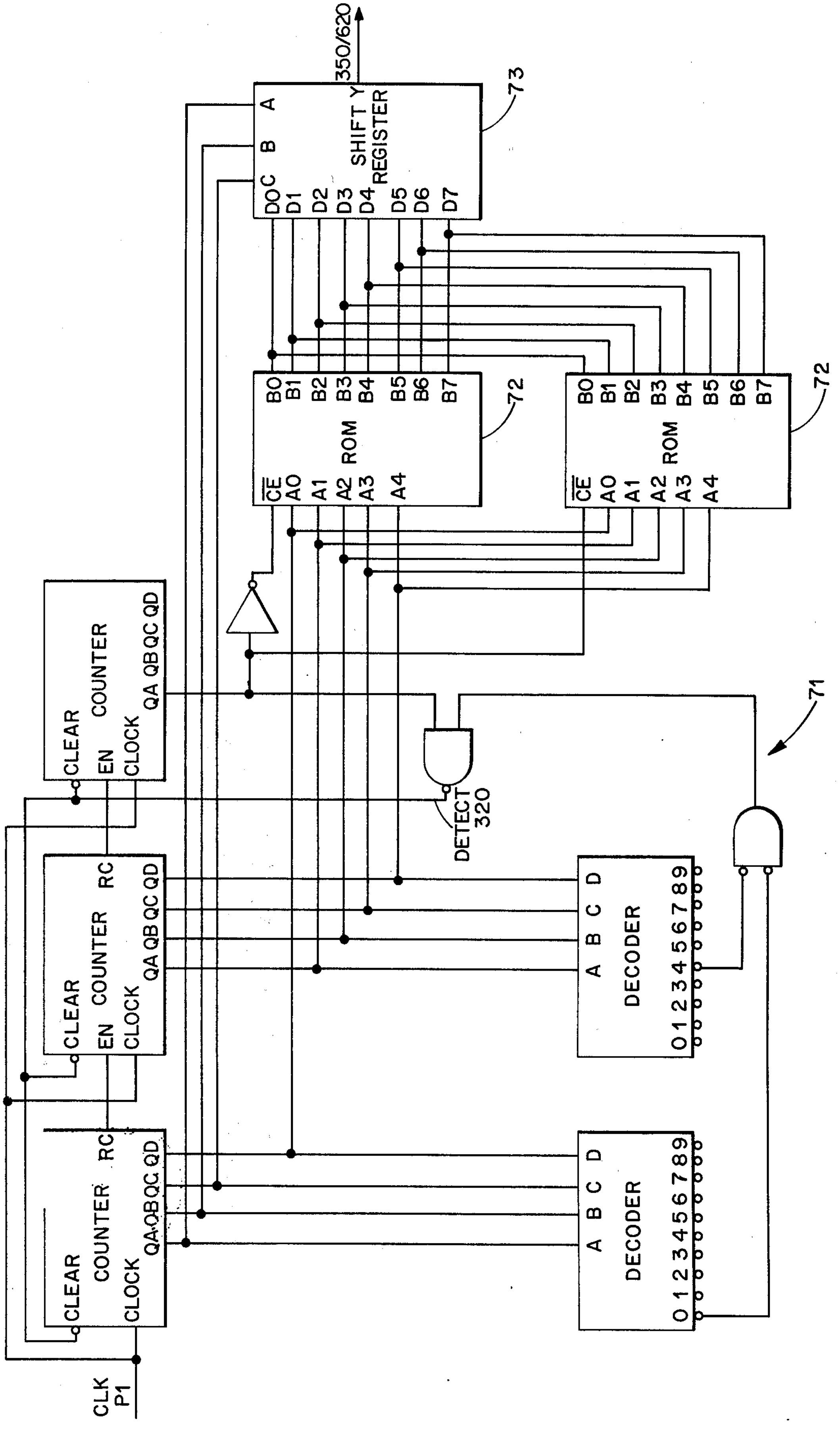

FIG. 7 illustrates a similar dual frequency tone generator 70 including a counter 71, a read-only memory 72, and a parallel-to-serial shift register 73. The tone generator 70 produces an output pattern of 320 bits labeled 350/620 which is convertible to a dual frequency tone of 350 and 620 Hz.

Figure 8:
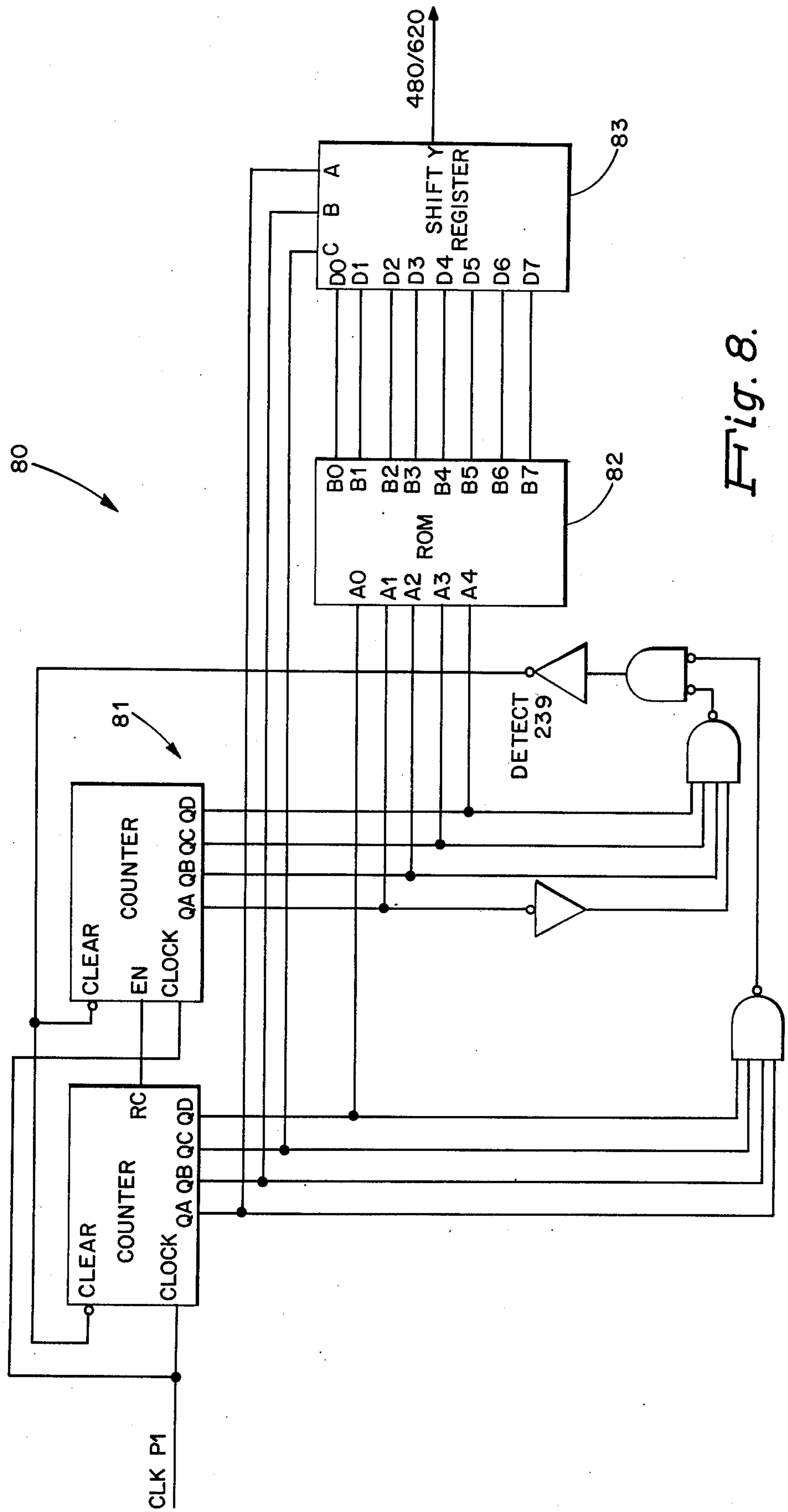

A third dual frequency tone generator 80 is illustrated in FIG. 8. A counter 81 counts through a recurring sequence of 239 clock pulses CLKP1. The counter controls a read-only memory 82 and a parallel-to-serial shift register 83. The resulting output bit pattern labeled 480/620 is convertible to an audio signal of 480 and 620 Hz in combination.

Figure 9:
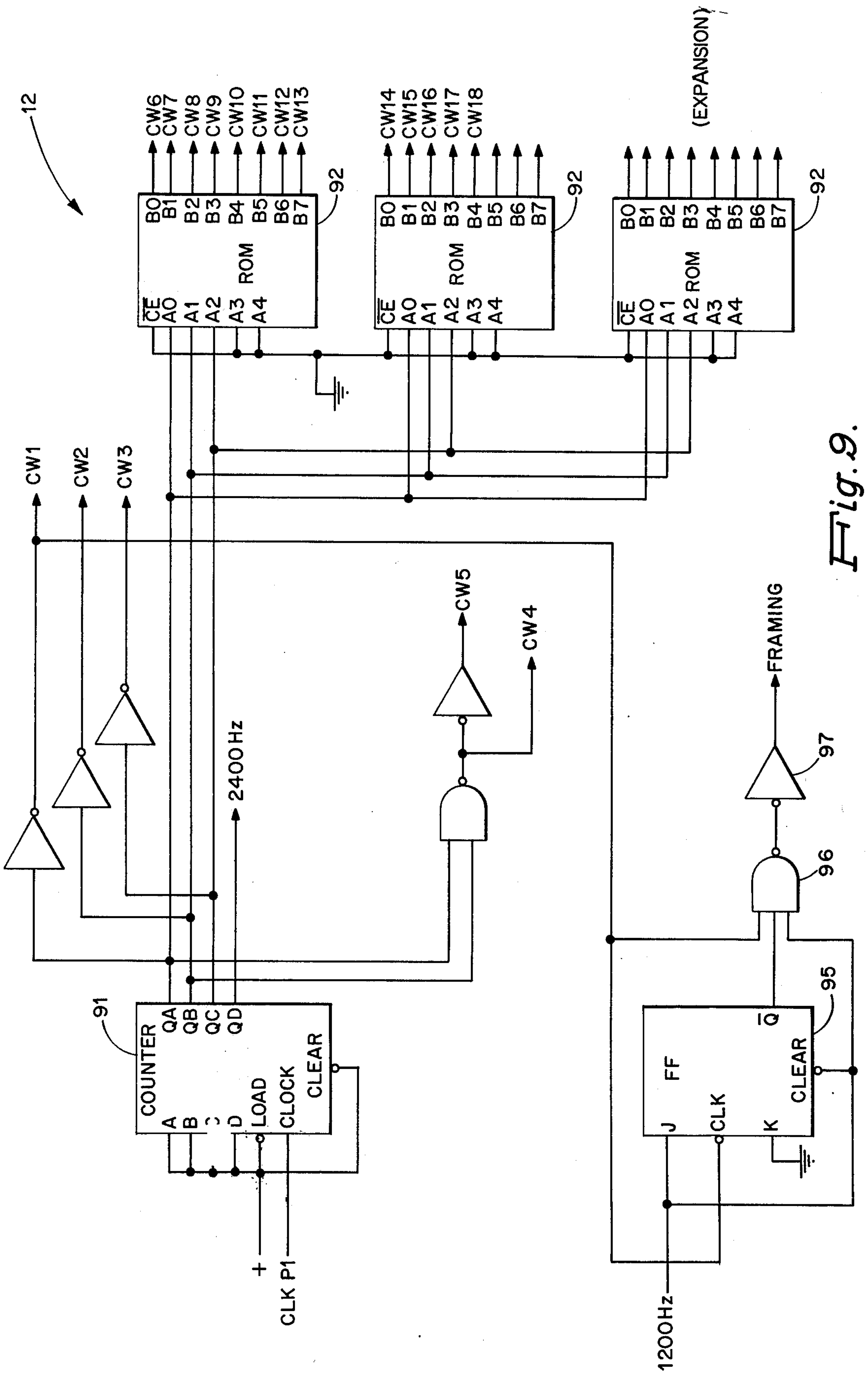
FIG. 9 is a logic diagram of a generator for producing digital codewords.

FIG. 9 illustrates the details of the codeword generation section 12 which generates several 8-bit permutable codewords. It is possible to produce 36 different permutable codewords within an 8-bit format. The present system utilizes fewer codewords than this, but the number can be increased. The codeword generation section 12 includes a counter 91 which is operated by the 38.4 KHz clock pulses CLKP1. Certain of the desired codewords are produced directly from the outputs of the 4-stage counter 91 and by combining and inverting to produce codewords CW1 through CW5. The outputs of the counter stages are applied to an arrangement of read-only memories 92. Each of the read-only memories as connected can contain up to eight 8-bit codewords. bits for each codeword are read out serially at the 38.4 KHz rate. In the specific embodiment shown eighteen codewords CW1 through CW18 are utilized.

The inverted output of the first counting stage of the counter 91 is applied to an arrangement including a JK flip-flop 95, a NAND gate 96, and an inverter 97 as shown in FIG. 9. The input pulses to this arrangement from the counter 91 are at a 19.2 KHz rate. A 1200 Hz signal which is obtained from another counter in the apparatus to be described hereinbelow is also applied to the arrangement as shown. The resulting output signal labeled FRAMING is a 52 microsecond pulse repeated at the rate of 1200 Hz.

Figure 10:
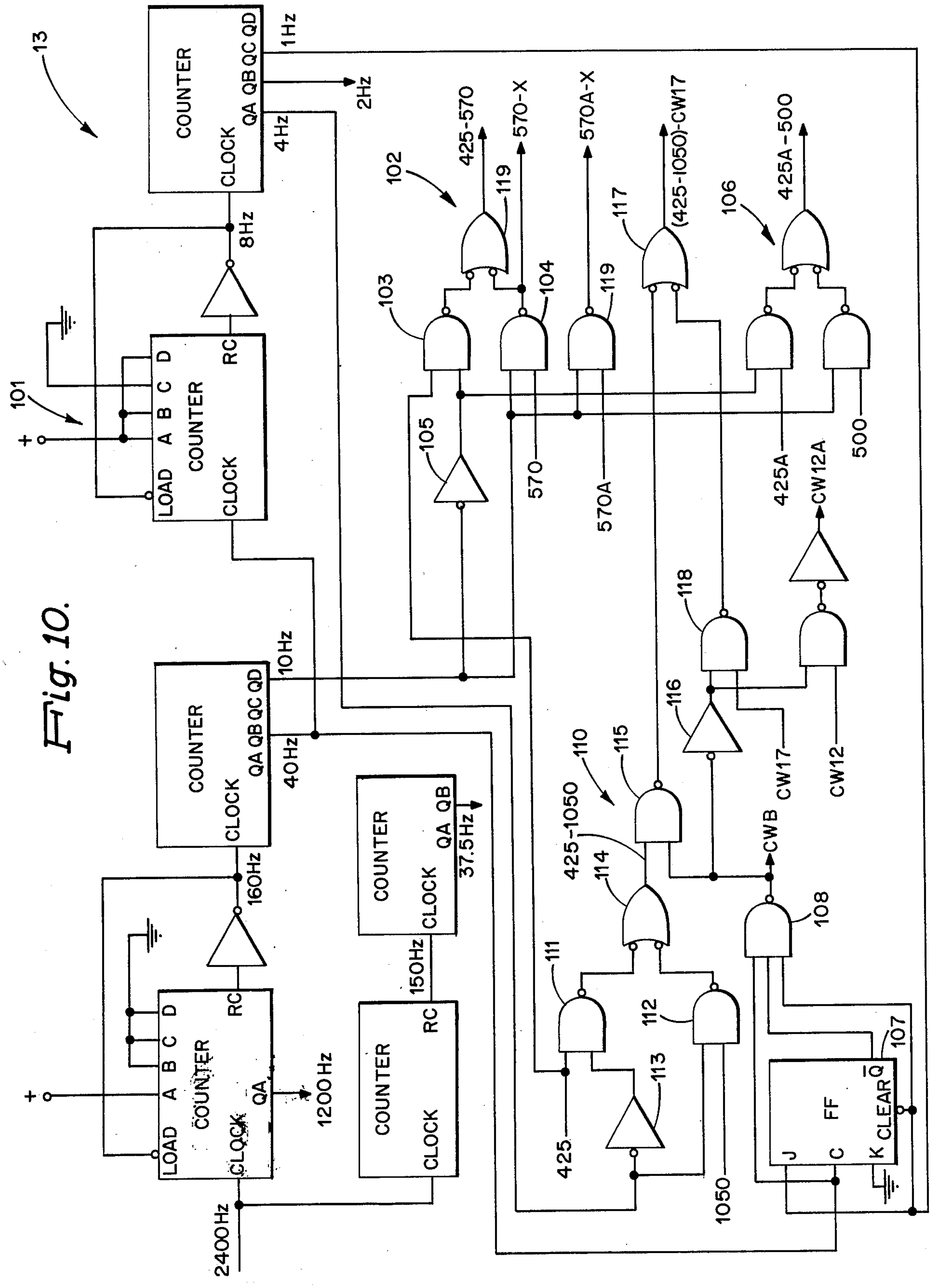
FIG. 10 is a logic diagram illustrating frequency-shift keying circuitry employed in the apparatus.

FIG. 10 illustrates the frequency-shift keying circuitry 13 for combining certain of the signals produced by the tone and codeword generation sections 10, 11, and 12. The circuitry includes a frequency divider 101 of counters and other components in a straightforward arrangement as shown. The divider is clocked by 2400 Hz squarewave pulses which are obtained from the fourth counter stage of the counter 91 of the codeword generation section 12. The output of the first stage in the frequency divider is a 1200 Hz squarewave signal which is applied to the JK flip-flop 95 as shown in FIG. 9. The frequency divider 101 also produces squarewave output pulses of 40 Hz, 37.5 Hz, 10 Hz, 4 Hz, 2 Hz, and 1 Hz which are employed in controlling the operations of the frequency-shift keying circuitry 13 and also of other portions of the apparatus.

A frequency-shift keyed combination of the 425 Hz tone digital signal and the 570 Hz tone signal at a 10 Hz rate is provided by the arrangement 102. The 425 signal is applied to a NAND gate 103 and the 570 signal is applied to d NAND gate 104. The 10 Hz squarewave pulses from the frequency divider 101 are applied directly to the NAND gate 104 and through an inverter 105 to NAND gate 103. The outputs of the NAND gates 103 and 104 are applied to a NAND gate 119. The resulting output signal labeled 425-570 is a digital bit pattern which when converted produces an audible tone that varies between 425 and 570 Hz at a 10 Hz rate. The output of the NAND gate 104 is also taken as a signal labeled 570-X which when converted produces an audible 570 Hz tone that goes on and off at the 10 Hz rate.

The digital signals 425A and 500 together with the 10 Hz and inverted 10 Hz squarewave pulses are applied to an arrangement of NAND gates 106 to produce a frequency-shift keyed digital signal labeled 425A-500. The 10 Hz squarewave pulses and the 570A digital signal are also applied to a NAND gate 119 to produce a signal 570A-X which converts to an audible tone of 570 Hz, at the appropriate amplitude, that goes on and off at the 10 Hz rate.

An arrangement of a JK flip-flop 107 and a NAND gate 108 is operated by 40 Hz and 1 Hz squarewave pulses from the frequency divider 101 to produce a control or timing signal labeled CWB. The CWB signal is a 12.5 millisecond pulse occurring at a 1 Hz rate.

The CWB timing signal is employed in a frequency-shift keying arrangement 110 involving the 425 and 1050 tone signals and the CW17 codeword signal. The 425 signal is applied to a NAND gate 111 and the 1050 signal is applied to another NAND gate 112. The 4 Hz squarewave pulses are applied directly to the NAND gate 112 and through an inverter 113 to the NAND gate 111. The outputs of the NAND gates 111 and 112 are applied to a NAND gate 114. The output of the NAND gate 114 is a frequency-shift key signal labeled 425-1050 which shifts frequencies at a 4 Hz rate between the 425 and 1050 signals. This signal is applied to a NAND gate 115. The CWB timing pulses are also applied to the NAND gate 115 and through an inverter 116 to a NAND gate 118. The other input to the NAND gate 118 is the CW17 digital codeword signal. The outputs of the NAND gates 115 and 118 are applied to a NAND gate 117. The output of the NAND gate 117 is a frequency-shift keyed signal labeled (425-1050)-CW17 which varies between 425 and 1050 Hz at a 4 Hz rate and which is interrupted every second for a period of 12.5 milliseconds during which the CW17 codeword is present.

Figure 11:
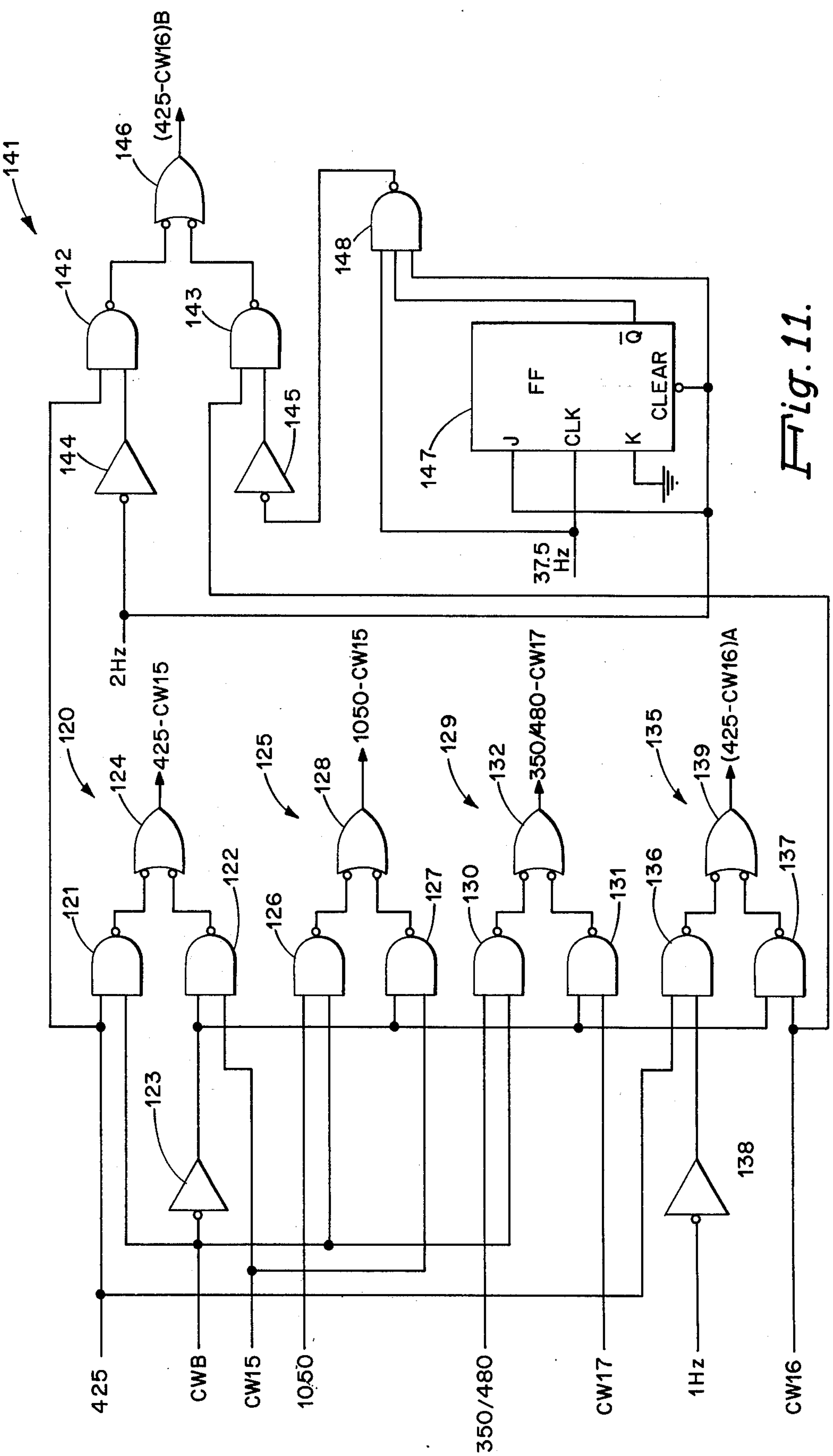
FIG. 11 is a logic diagram illustrating switching circuitry for combining certain of the digital signals generated within the apparatus.

FIG. 11 illustrates several arrangements which combine tone signals and codeword signals. In one arrangement 120 the 425 signal is applied to a NAND gate 121 and the CW15 codeword signal is applied to another NAND gate 122. The CWB timing signal from the circuitry illustrated in FIG. 10 is applied directly to the NAND gate 121 and through inverter 123 to the NAND gate 122. The outputs of the NAND gates 121 and 122 are applied to a NAND gate 124. The output of the NAND gate labeled 425-CW15 is a 425 Hz tone signal which is interrupted every second for a period of 12.5 milliseconds by a series of CW15 codewords.

In a similar way an arrangement 125 of NAND gates 126, 127, and 128 produces a 1050 Hz tone signal which is interrupted every second for a 12.5 millisecond burst of CW15 codewords. The arrangement 129 of NAND gates 130, 131, and 132 produces an output signal labeled 350/480-CW17 which is a dual frequency tone of 350 and 480 Hz that is interrupted every second for a 12.5 millisecond burst of CW17 codewords.

An arrangement 135 includes a NAND gate 136 to which the 425 signal is applied and a NAND gate 137 to which the CW16 codeword is applied. A 1 Hz clock pulse from the frequency divider 101 of FIG. 10 is applied through inverter 138 to the NAND gate 136. The inverted CWB timing signal is applied to the other NAND gate 137. the outputs of the NAND gates 136 and 137 are applied to a NAND gate 139. The output of the NAND gate 139 labeled (425-CW16)A is a 425 Hz tone signal which is turned on and off at a 1 Hz rate and includes a 12.5 millisecond burst of CW16 codewords during each off period.

Another arrangement 141 has a NAND gate 142 to which the 425 signal is also applied and a NAND gate 143 to which the CW16 codeword signal is also applied. The 2 Hz squarewave pulses from the frequency divider 101 of FIG. 10 are applied through an inverter 144 to the NAND gate 142. An arrangement of a JK flip-flop 147 and a NAND gate 148 operated by squarewave pulses of 2 Hz and 37.5 Hz from the frequency divider 101 produces a timing signal of a 13.3 millisecond pulse every ½ second. This timing signal is applied through an inverter 145 to the NAND gate 143. The outputs of NAND gates 142 and 143 are applied to a NAND gate 146. The output of the NAND gate 146 labeled (425-CW16)B is a 425 Hz tone signal which is turned on and off at a 2 Hz rate and includes a 13.3 millisecond burst of CW16 codewords during each off period.

The gating arrangements 135 and 141 produce combinations of tone and codeword signals which are particularly useful as "line busy" and "trunk busy" audible signals, respectively, to telephone subscribers. In addition, the codeword CW16 is provided to cause appropriate operation of equipment in the system.

Figure 12:
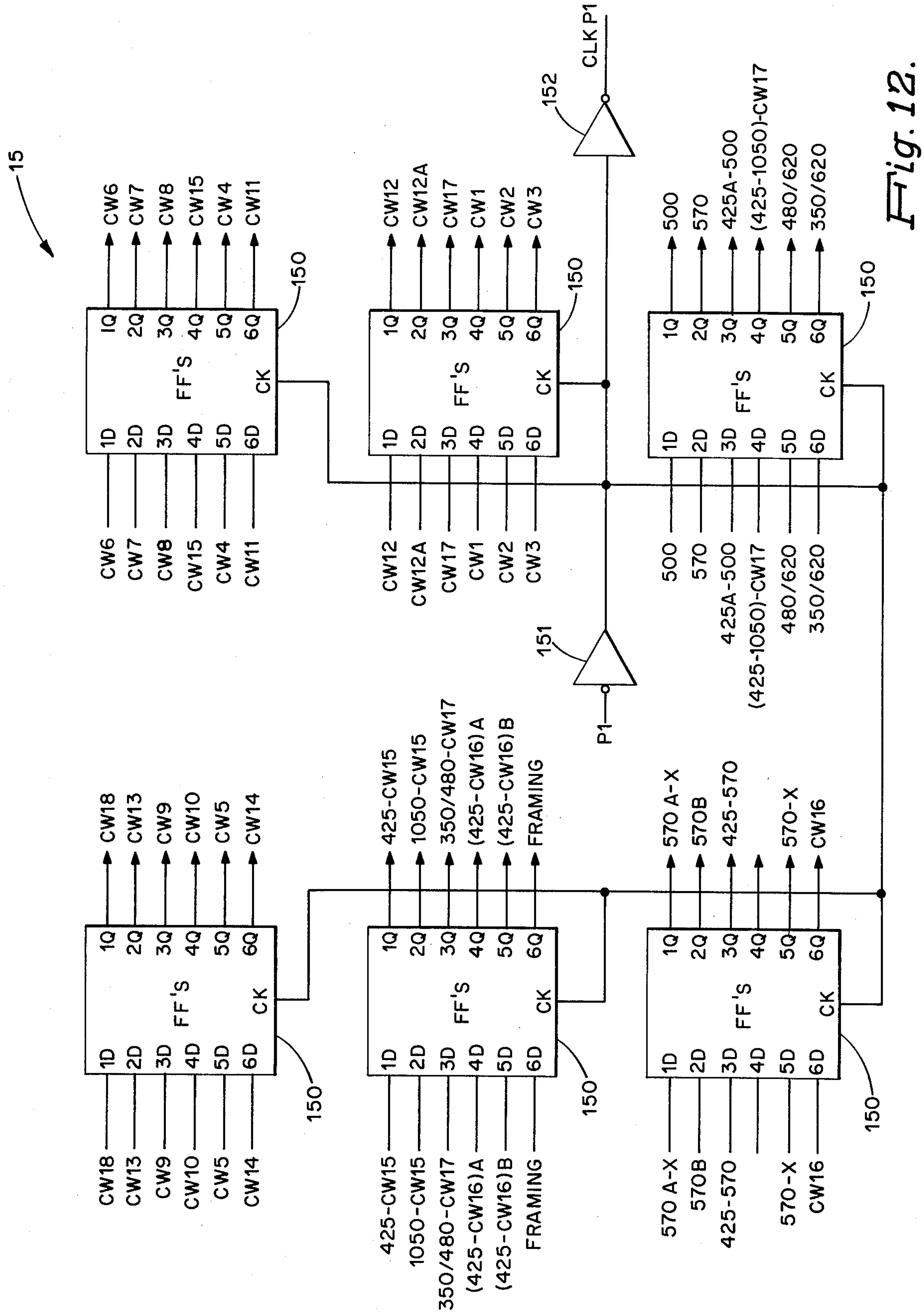
FIG. 12 is a logic diagram illustrating an arrangement of registers for storing digital signals produced in the apparatus.

FIG. 12 illustrates the output storage registers 15 which are arrays of D-type flip-flops 150. Various tone signals, codeword signals, and combination signals are applied to the registers as indicated in FIG. 12. The signal data is clocked into the registers at the 38.4 Hz rate by clock pulses P1 applied through inverter 151. The inverted p1 clock pulses are also applied to an inverter 152 to produce the 38.4 Hz clock pulses CLKP1 which control the operation of the tone and codeword generators as explained hereinabove.

Figure 13:
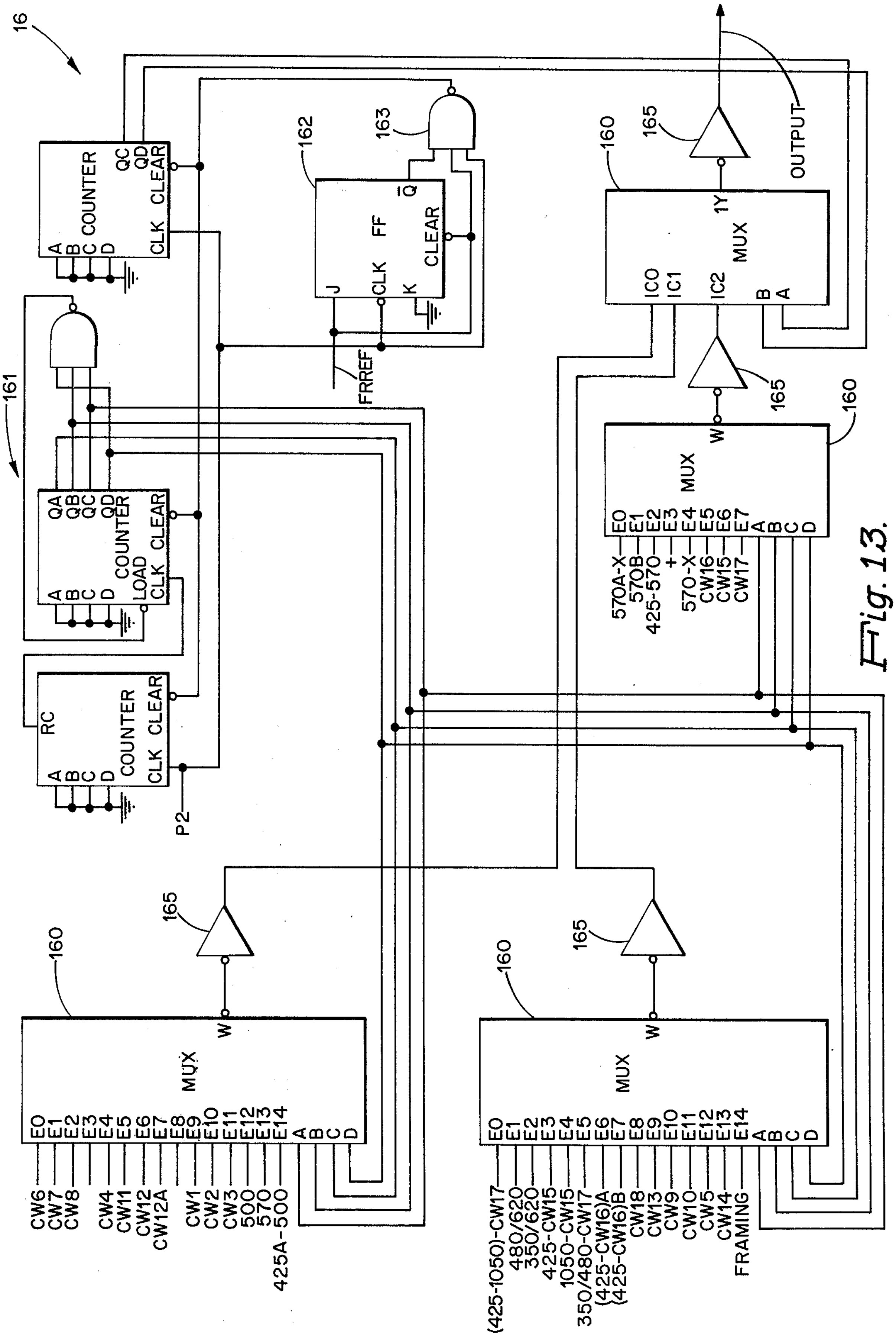
FIG. 13 is a logic diagram illustrating an output multiplexer for time division multiplexing the contents of the registers onto an output line as a serial bit stream in channel time slots.

FIG. 13 illustrates the output mulitplexer 16 which includes an arrangement of multiplexer elements 160 and inverters 165. THe multiplexer 16 is controlled by a counter 161 which is a straightforward arrangement of counter elements and a NAND gate. The counter 161 counts repeatedly through a sequence of 240 9.216 MHz clock pulses P2. An arrangement of a JK flip-flop 162 and a NAND gate 163 also receives the P2 clock pulses and a reference signal FRREF. A FRREF pulse occurs once every frame of 60 channels or at the 38.4 KHz rate to assure that the counter 161 and therefore the output of the multiplexer is properly synchronized with other sections of the system.

The various tone, codeword, and combination signals in the registers 15 are applied to the multiplexer 16 as shown in FIG. 13. Each signal is sampled in sequence to produce a TDM OUTPUT having a bit rate of 2,304 MHz in 60 output channels. The TDM OUTPUT signal includes all the signalling codes employed in the communication system. The signalling codes are continuously available and are in the same CVSD digital format as the data from subscribers to the switching network and the switching network to subscribers. The digital tone signals, the codeword signals, and the combination signals are all produced directly in digital format. In addition, signals for particular purposes such as the FRAMING signal readily may be provided by the generating apparatus as described.

The use of a digital signal generator having a TDM output is illustrated in patent application Ser. No. 582,258 entitled "Time Division Switching Network" filed on May 30, 1975 by Robert J. Bojanek, Robert G. Field, and Marvin S. Mason now U.S. Pat. No. 3,959,596, issued May 25, 1976, and assigned to the assignee of the present application. The communication system described therein employs a 64 channel TDM format. As explained in the application the digital signal generators operate in the same 64 channel TDM format as the incoming data signals to the switching network; and, therefore, may be directly switched by the network in the same manner as the data signals.

Thus, while there has been shown and described what is considered a preferred embodiment of the present invention, it will be obvious to those skilled in the art that various changes and modifications may be made therein without departing from the invention as defined by the appended claims.

What is claimed is:

1. Digital signalling code generating apparatus including tone generating means for producing a plurality of recurring sequences of digital signals, each capable of being converted to a continuous audible tone;

codeword generating means for producing a plurality of recurring sequences of digital signals, each providing a continuously repeated codeword;

combining means coupled to said tone generating means and said codeword generating means for producing a plurality of recurring sequences of digital signals which are combinations of sequences of digital signals produced by said tone generating means, and said codeword generating means; and storage means coupled to said tone generating means, said codeword generating means, and said combining means for storing digital signals from said tone generating means, said codeword generating means, and said combining means; and mulitplexing means coupled to said storage means and to an output line for time division mulitplexing digital signals in said storage means onto the output line in a plurality of channels whereby a different predetermined digital signalling code pattern is continuously available in each channel.

2. Digital signalling code generating apparatus in accordance with claim 1 wherein said tone generating means comprises a plurality of individual tone generating means, each including read-only memory means containing a predetermined number of stored bits arranged to provide a digitized tone signal when read out in predetermined order; and counting means for counting repeatedly through said predetermined number, said counting means being coupled to said read-only memory means and being operable repeatedly to read out the bits stored in the read-only memory means in said predetermined order;

whereby said tone generating means continuously produces a plurality of bit patterns of presynthesized tone signals.

3. Digital signalling code generating apparatus in accordance with claim 2 wherein each of said codewords in a permutable codeword having an equal number of bits;

said codeword generating means includes read-only memory means containing a plurality of arrangements of stored bits, each of said arrangements containing said number of stored bits and providing a codeword when the number of stored bits are read out in predetermined order; and counting means for counting repeatedly through said number, said counting means being coupled to said read-only memory means and being operable repeatedly to read out the bits stored in each arrangement in the read-only memory means in said predetermined order;

whereby said codeword generating means continuously produces a plurality of repeated bit patterns constituting permutable codewords.

4. Digital signalling code generating apparatus in accordance with claim 3 wherein said combining means comprises a plurality of switching means, each including gating means for alternately passing a first series of bits constituting several sequences of digital signals from one of said generating means and a second series of bits constituting several sequences of digital signals from one of said generating means;

whereby said combining means continuously produces a plurality of repeated bit patterns of combination codes.

5. Digital signalling code generating apparatus in accordance with claim 4, including clock pulse means for applying a continuous series of clock pulses to the counting means of said individual tone generating means, to the counting means of said codeword generating means, and to said storage means;

each of said counting means being operable to advance one count in response to each clock pulse whereby a bit of each of said bit patterns is produced during each clock pulse;

said storage means being operable to store the bit of each of the bit patterns applied thereto during each clock pulse; and said multiplexing means being operable to sample the bit from each bit pattern stored in the storage means in sequence during the period of each clock pulse thereby time division multiplexing the bits onto the output line in a plurality of channels.

* * * * *